United States Patent
Kwon et al.

(10) Patent No.: US 8,013,746 B2
(45) Date of Patent: Sep. 6, 2011

(54) METHOD OF PROVIDING ALARM SERVICE UPON MOVEMENT OUT OF SAFETY ZONE

(75) Inventors: Sang-woon Kwon, Seongnam-si (KR); Jin-hee Yoon, Seoul (KR); Joo-mun Lee, Yongin-si (KR); Se-hyun Oh, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1167 days.

(21) Appl. No.: 11/630,461

(22) PCT Filed: Jun. 30, 2005

(86) PCT No.: PCT/KR2005/002070
§ 371 (c)(1),
(2), (4) Date: Dec. 22, 2006

(87) PCT Pub. No.: WO2006/004352
PCT Pub. Date: Jan. 12, 2006

(65) Prior Publication Data
US 2007/0243869 A1 Oct. 18, 2007

(30) Foreign Application Priority Data
Jun. 30, 2004 (KR) .................. 10-2004-0050604

(51) Int. Cl.
*A01K 15/02* (2006.01)
*A01K 1/00* (2006.01)
*H01L 21/3065* (2006.01)

(52) U.S. Cl. ............... 340/573.4; 455/456.5; 455/456.1

(58) Field of Classification Search .............. None
See application file for complete search history.

(56) References Cited

U.S. PATENT DOCUMENTS

| | | | | |
|---|---|---|---|---|
| 4,136,338 A * | 1/1979 | Antenore | ...................... | 340/551 |
| 5,588,043 A * | 12/1996 | Tiedemann et al. | ........ | 455/435.1 |
| 6,044,069 A * | 3/2000 | Wan | ............... | 370/311 |
| 6,721,306 B1 * | 4/2004 | Farris et al. | .................... | 370/352 |
| 6,721,755 B1 * | 4/2004 | Lee | ............... | 707/102 |
| 6,748,213 B1 * | 6/2004 | Kim | .............. | 455/433 |
| 6,975,873 B1 * | 12/2005 | Banks et al. | .............. | 455/456.5 |
| 7,096,030 B2 * | 8/2006 | Huomo | ...................... | 455/456.3 |

(Continued)

FOREIGN PATENT DOCUMENTS
KR 1997-702676 5/1997
(Continued)

*Primary Examiner* — Rafael Pérez-Gutiérrez
*Assistant Examiner* — Frank Donado
(74) *Attorney, Agent, or Firm* — Lowe Hauptman Ham & Berner LLP

(57) ABSTRACT

Disclosed herein is a method of providing alarm service upon movement out of a safety zone in a mobile communication network. The method is implemented in such a way as to acquire past location registration information for a ward's mobile terminal designated by a subscriber (guardian), the past location registration information being base station identifiers associated with base stations at which the past locations of the ward's mobile terminal has previously been registered, store the acquired past location registration information to a My Base Station DB allocated to the ward, check base station information, associated with a base station at which the current location of the ward's mobile terminal has been registered, at the time of an observation request, determine whether base station information has been stored in the My Base Station DB, detect movement out of the safety zone when the base station information has not been stored in the My Base Station DB, and notify the subscriber of movement out of the safety zone.

10 Claims, 7 Drawing Sheets

U.S. PATENT DOCUMENTS

| | | | |
|---|---|---|---|
| 7,111,305 B2 * | 9/2006 | Solter et al. | 719/318 |
| 7,127,246 B1 * | 10/2006 | Muhonen | 455/433 |
| 7,359,724 B2 * | 4/2008 | Torvinen | 455/518 |
| 2002/0042277 A1 * | 4/2002 | Smith | 455/456 |
| 2002/0176579 A1 * | 11/2002 | Deshpande et al. | 380/270 |
| 2003/0030561 A1 * | 2/2003 | Yafuso et al. | 340/573.4 |
| 2004/0104841 A1 * | 6/2004 | Syrjarinne | 342/357.13 |
| 2004/0147252 A1 * | 7/2004 | Strom | 455/418 |
| 2004/0203769 A1 * | 10/2004 | Sakanaba | 455/435.1 |
| 2004/0219932 A1 * | 11/2004 | Verteuil | 455/456.2 |

FOREIGN PATENT DOCUMENTS

| | | |
|---|---|---|
| KR | 2002-74035 | 8/2001 |
| KR | 2003-15577 | 2/2003 |
| KR | 2003-71267 | 9/2003 |

* cited by examiner

METHOD OF PROVIDING ALARM SERVICE UPON MOVEMENT OUT OF SAFETY ZONE

CROSS REFERENCE TO RELATED APPLICATION

This application is the National Phase application of International Application No. PCT/KR2005/002070, filed Jun. 30, 2005, which designates the United States and was published in English. This application, in its entirety, is incorporated herein by reference.

FIELD OF THE INVENTION

The present invention relates, in general, to a supplementary mobile communication service and, more particularly, to a method of providing alarm service upon movement out of a safety zone in a mobile communication network, which sets a safety zone for a ward based on the past location registration information of the ward's mobile terminal, and checks the current location information of the ward's mobile terminal, thus monitoring movement out of the safety zone.

BACKGROUND OF THE INVENTION

Currently, parents' interest in preventing children from going missing is increasing, and various products and services for preventing children from going missing are being developed to satisfy parents' demand. In a mobile communication network, location-tracking service is one of the services for preventing children from going missing. The location tracking service is a service that detects the location of a mobile terminal in a child's possession and informs his or her guardian of the location of the child's mobile terminal.

The location-tracking service uses known technologies that detect the locations of mobile terminals. Currently well-known technologies for detecting the locations of mobile terminals are generally classified into Global Positioning System (GPS) based positioning schemes and base station based positioning schemes.

The base station based positioning schemes are sub-divided into a scheme that uses the cell identifier of a base station communicating with mobile terminals, and a scheme that performs estimation using approximate distances from three base stations that are capable of receiving signals from mobile terminals.

Meanwhile, the GPS-based positioning schemes are schemes that transmit location information, which is received by a GPS receiver installed in a mobile terminal, to a server through the mobile terminal. That is, the GPS receiver determines current location information and time information by processing signals received from man-made satellites, and provides the determined location and time information to a server through the mobile terminal. A GPS is a system that is configured to determine location in three dimensions, which are composed of latitude, longitude and altitude, and time deviation using man-made satellites.

Although the conventional location tracking service can be usefully used when children have gone missing, it is of little use in the case in which a guardian desires to monitor children playing or studying in a specific zone. That is, in the case of using a conventional location tracking service, the guardian must monitor a ward's location at all times. Furthermore, in the case in which the ward moves out of the specific zone while the guardian neglects to monitor the child, it may be too late for the guardian to react to the movement because the guardian is not promptly made aware of it.

Meanwhile, Korean Laid-open Patent Application No. 2003-71267 proposes technology that sets a specific zone as a safety zone, and tracks the location of the ward's mobile terminal, and informs a guardian that a ward has moved out of the specific zone when the ward moves out of a safety zone.

However, the Korean Laid-open Patent Application No. 2003-71267 conceptually described only methods of setting a safety zone, and checking whether the ward's mobile terminal has moved out of the safety zone, but failed to propose concrete methods to achieve the object.

SUMMARY OF THE INVENTION

Accordingly, the present invention has been made keeping in mind the above problems occurring in the prior art, and an object of the present invention is to provide a method of setting a safety zone for a ward based on the past location registration information of a ward's mobile terminal, and informing a guardian that the ward has moved out of the safety zone immediately after the ward moves out the prescribed safety zone.

In order to accomplish the above object, the present invention provides a method of providing alarm service upon movement out of a safety zone using a base station-based positioning scheme in a mobile communication network, the mobile communication network includes a service providing server that is connected to a home location registration unit, a visitor location registration unit, and the Internet to execute safety zone setting, detection and an alarm upon movement out of the safety zone. The inventive method includes the steps of acquiring the past location registration information of a ward's mobile terminal designated by a subscriber (guardian), the past location registration information being base station identifiers associated with base stations in which past locations of the ward's mobile terminal have previously been registered; setting an observation region including a region or a point designated by a subscriber; checking base stations within the observation region among the base stations where past locations of the ward's mobile have been registered; storing information about the base stations existing within the observation region, to a My Base Station Database (DB) allocated to the ward; checking current location information at the time of observation request, the current location information being a base station identifier associated with a base station in which a current location of the ward's mobile terminal is registered; judging whether current location information has been stored in the My Base Station DB; determining that the ward has moved out of the safety zone when the current location information has not been stored in the My Base Station DB and notifying the subscriber of the movement; and periodically checking a location of the ward when the current location information has been stored in the My Base Station DB.

The present invention sets a safety zone based on the location registration history information of a ward's mobile terminal, and can inform the guardian of the ward's movement when the ward moves out of the safety zone. Furthermore, the present invention causes the range of the safety zone to be successively maximized to keep up with the ward's location registration history, thus being capable of precisely monitoring the ward's movement.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

A preferred embodiment according to the present invention is described in detail with reference to the accompanying drawings below. If it is deemed that details of known technologies make the gist of the present invention unclear, the details will be omitted in the description below. Furthermore, terms used below are defined in relevance to the functions of elements in the present invention, and these terms may vary according to field of use, or convention. Accordingly, the definition of the terms will be made based on overall context of the present specification.

Figure 1:
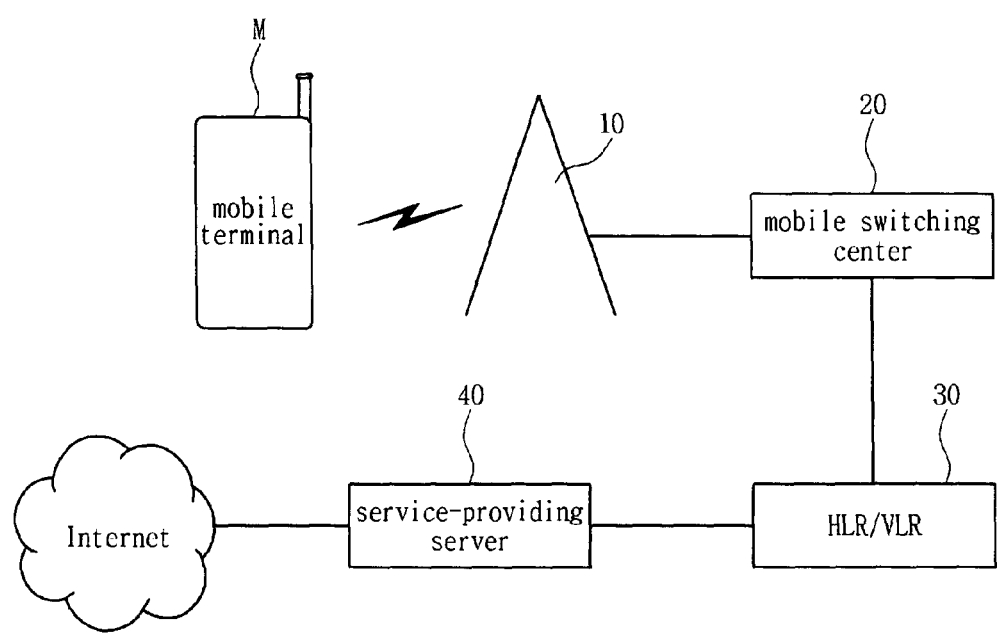
FIG. 1 is a diagram showing the construction of a mobile communication network to which the present invention is applied.

With reference to FIG. 1, the construction of a mobile communication network to which the present invention is applied is described. FIG. 1 is a diagram showing the construction of the mobile communication network to which the present invention is applied.

As shown in FIG. 1, the mobile communication network to which the present invention is applied is a general mobile communication network, including a mobile terminal M, a base station 10, a base station controller (not shown), a mobile switching center 20, and a Home Location Register (HLR)/Visitor Location Register (VLR) 30. Furthermore, the mobile communication network is provided with a service-providing server 40 that is connected to the HLR/VLR 30 and the Internet according to the present invention.

The mobile terminal M is a terminal, such as a mobile phone, a cellular phone, or a Personal Digital Assistant (PDA), which is capable of connecting to a mobile communication network. Particularly, when graphic support is available, the mobile terminal M is capable of displaying Geographic Information System (GIS) information provided from the service-providing server 40, and designating a safety zone. The mobile terminal M connects to the base station 10 at which reception intensity is strongest, and the base station information with respect to the base station 10 connected to the mobile terminal M becomes the current location information of the mobile terminal. The base station information is stored in the HLR/VLR 30.

Current base station information associated with the current location of the mobile terminal M and past base station information associated with the past locations of the mobile terminal M are stored in the HLR/VLR 30 in time sequence.

Furthermore, in the HLR, service types and information about the status of mobile terminals, which are registered by users, are stored.

The service-providing server 40 is a service provider management apparatus for providing alarm service upon movement out of the safety zone according to the present invention. The service-providing server 40 checks from the HLR whether a guardian has registered for the service, and collects and stores the base station information, which has been stored in the HLR/VLR 30 and is associated with the base stations in which the locations of a ward's mobile terminal have been registered. Further more, the service-providing server 40 updates a My Base Station DB using the collected base station information, and sets a safety zone based on the base station information stored in the My Base Station DB. In this specification, the term of 'My Base Station DB' means a database storing the information of the base stations located within a safety zone designated for a specific ward. When the mobile terminal of a ward moves out of the safety zone, the service-providing server 40 executes an alarm upon the movement. The alarm executed by the service-providing server 40 upon the movement may be implemented using SMS Short Message Service (SMS) or voice notification. Since an alarm executed upon the movement corresponds to general technology, no further description thereof is given below. The operation of the service-providing server 40 will be described in detail below.

Figure 2:
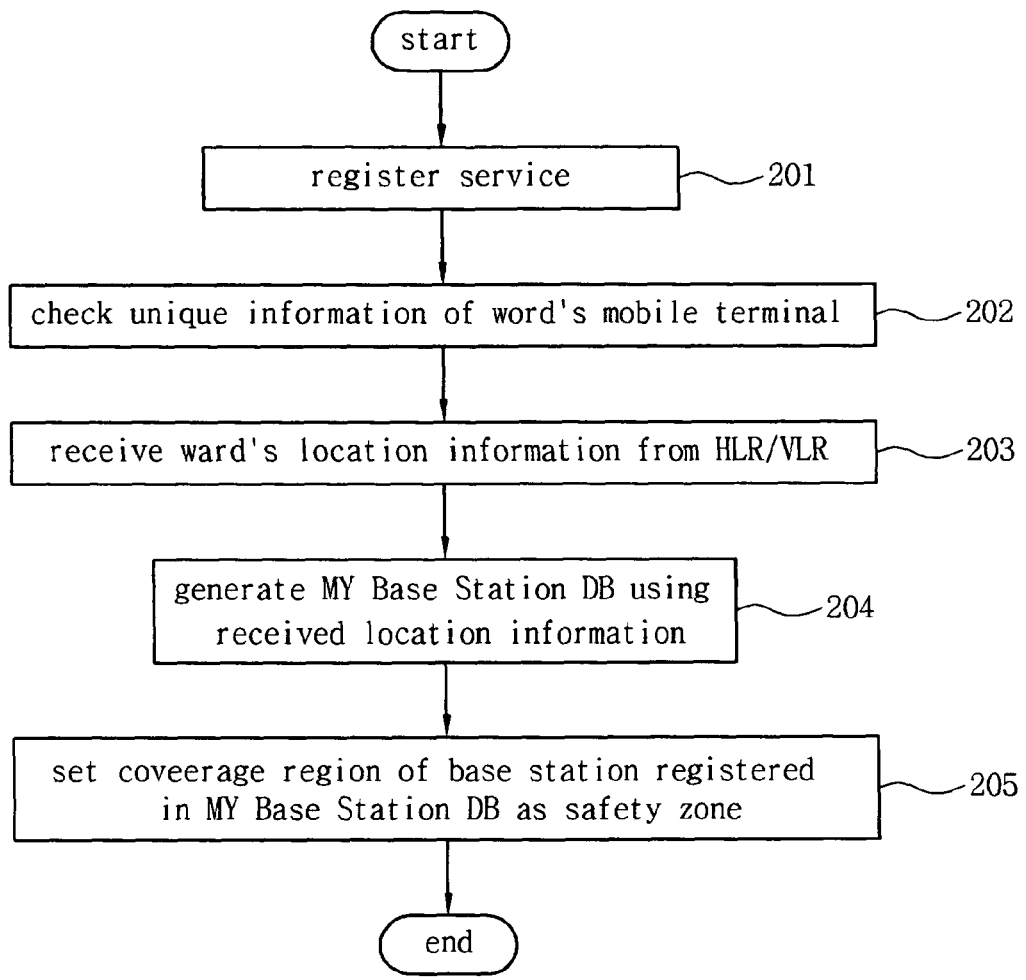
FIG. 2 is a flowchart illustrating a method of setting a safety zone according to a first embodiment of the present invention.
Figure 3:
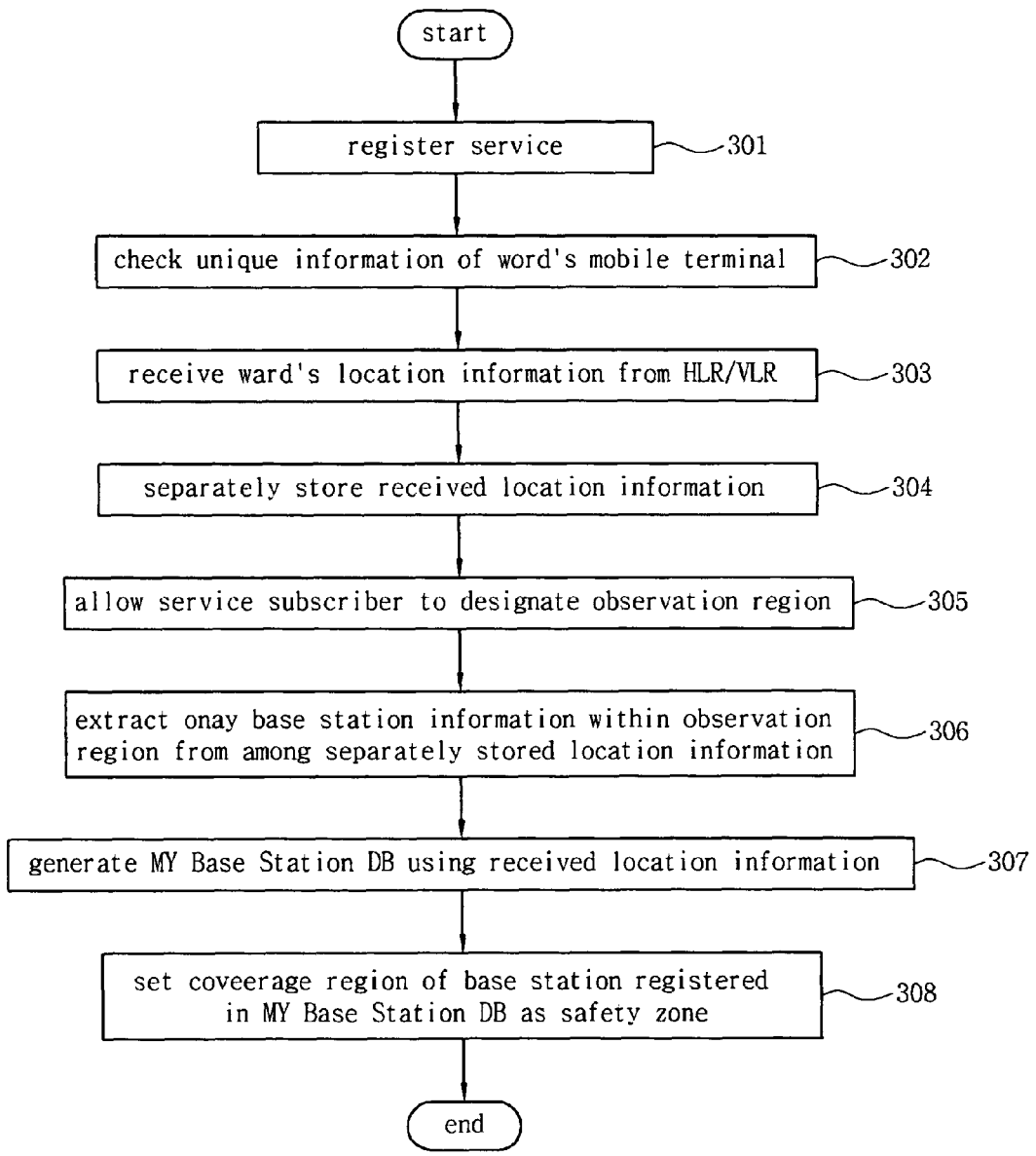
FIG. 3 is a flowchart illustrating a method of setting a safety zone according to a second embodiment of the present invention.
Figure 4:
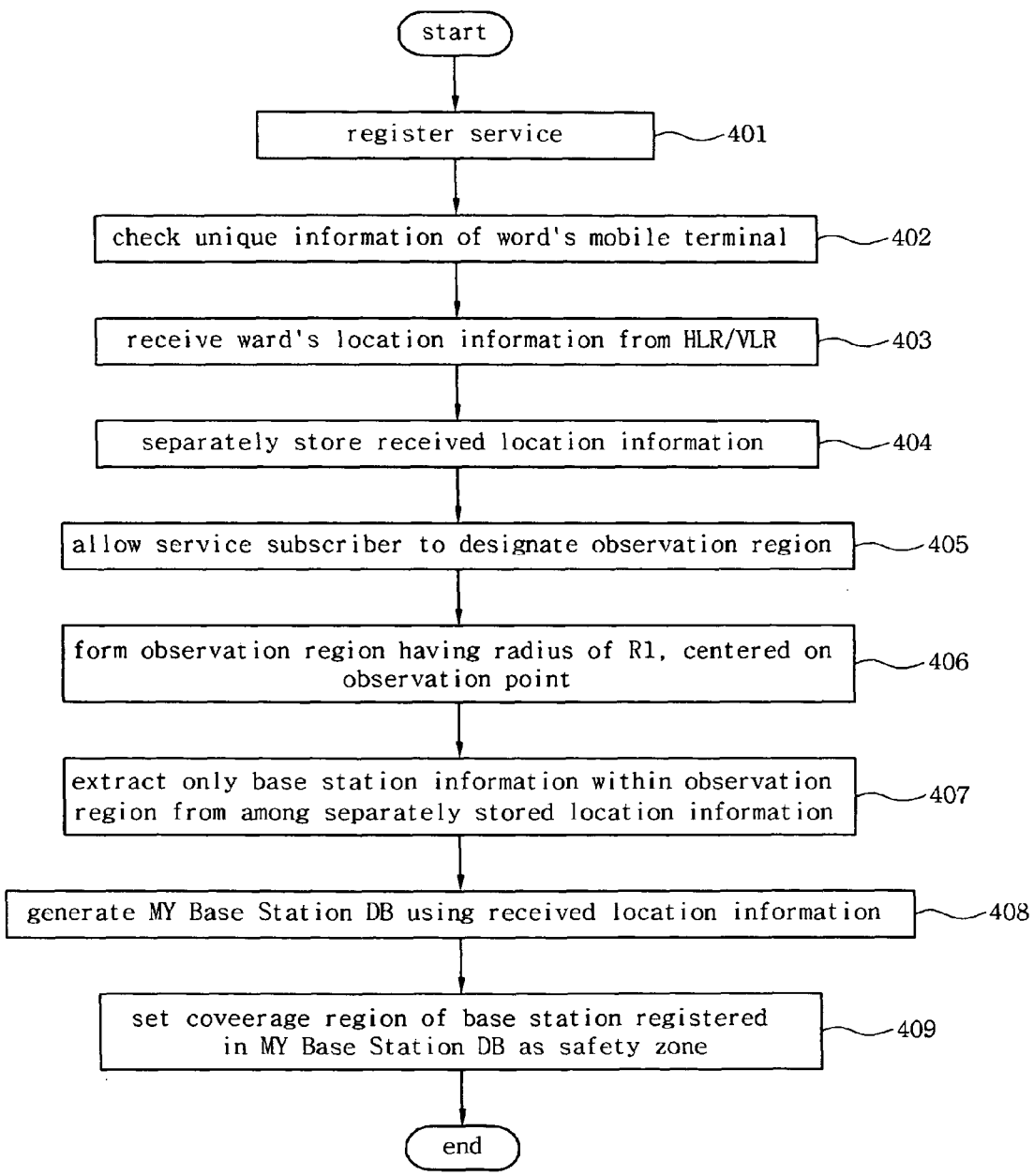
FIG. 4 is a flowchart illustrating a method of setting a safety zone according to a third embodiment of the present invention.

With reference to FIGS. 2 to 4, a method of setting a safety zone according to the embodiments of the present invention is described.

FIG. 2 is a flowchart illustrating a method of setting a safety zone according to a first embodiment of the present invention, and is related to the case where a service subscriber does not provide separate information about a safety zone setting. In this case, My Base Station DB includes all the past location registration information for the ward's mobile terminal.

The service of the present invention targets service subscribers. The registration of alarm service upon the movement out of the safety zone is performed in such a manner that the guardian is himself or herself connected to the service-providing server 40 using the ward's terminal, and applies/registers for the alarm service of the present invention at step 201.

Alternatively, a subscriber may telephone a customer center, and conduct application and registration for the service through a phone call with a service member. When registering for the alarm service for movement out of the safety zone, the guardian provides his/her own personal information, information about his own mobile terminal, and information about the ward's mobile terminal. Accordingly, when the guardian is registered as a subscriber, the service-providing server 40 stores the above-described information, which is provided from the subscriber, in a DB, and informs the HLR of the service registration. The HLR includes the information provided by the service-providing server 40 in the guardian's profile.

Meanwhile, at step 202, the service-providing server 40 checks the information of the ward' mobile terminal, that is, a Mobile Identification Number (MIN), which was provided by the guardian, when the guardian completed the service registration. Thereafter, at step 203, the service-providing server 40 transmits a past location request signal, including the MIN, to the HLR 30 and receives the past location registration information about the ward's mobile terminal from the HLR 30 as a result. The past location registration information of the ward's mobile terminal is the Identification (ID) information of base stations at which the ward's mobile terminal has registered its location.

When the service-providing server 40 receives the ward's past location registration information from the HLR 30, a separate memory area is allocated to the ward (or a subscriber), and the received past location registration information, that is, the ID information of the base stations, is stored in the memory area allocated to the ward. In this case, the memory area for the ward becomes the My Base Station DB for the ward at step 204. At step 205, the total coverage region of base stations stored in the My Base Station DB is automatically set as a safety zone when the My Base Station DB is generated.

With reference to FIG. 3, a method of setting a safety zone according to a second embodiment of the present invention is described. FIG. 3 is a flowchart illustrating a method of setting a safety zone according to a second embodiment of the present invention, which is related to the case where a safety zone is set using the past location registration information, which belongs to the past location registration information about the ward's mobile terminal, within an observation region that is set by the subscriber.

Similarly to the steps 201 to 203 of the first embodiment, the service-providing server 40 registers the guardian as a service subscriber at step 301. Thereafter, the service-providing server 40 checks the information about the ward's mobile terminal, and receives the ward's past location registration information from the HLR 30 at step 303. When receiving the past location registration information, the service-providing server 40 temporarily stores the received past location registration information in the separate memory area at step 304.

Thereafter, the service-providing server 40 provides GIS information to the guardian's (or subscriber's) mobile terminal. Therefore, the GIS information is displayed on the screen of the guardian's (or subscriber's) mobile terminal. The guardian (or subscriber) marks the corresponding region of a map with a circle using functions, such as region search/scaling-up/scaling-down/moving with respect to the GIS information provided to the mobile terminal, thus designating an observation region. When the subscriber designates the observation region, the subscriber's mobile terminal provides coordinate information about the marked observation region to the service-providing server 40. Accordingly, the service-providing server 40 receives the coordinate information about the marked observation region at step 305.

In this case, the observation region refers to an activity region that is considered safe for the ward.

The service-providing server 40 checks the range of the observation region, which is designated by the subscriber 40, through the received coordinate information. Furthermore, at step 306, the service-providing server 40 reads the ward's past location registration information, which is temporarily stored, from the memory area, and extracts only past location registration information that is associated with locations within the observation region designated by the subscriber, that is, the ID information of base stations at which the past locations were registered, from among pieces of the past location registration information.

When extracting the ID information of base stations located within the observation region, the service-providing server 40 allows the extracted past location registration information, that is, the ID information of base stations, to be stored in separate memory allocated for the ward (or subscriber). In this case, the memory area for the ward (or subscriber) becomes a My Base Station DB with respect to the ward (or subscriber) at step 307. When the My Base Station DB is generated, the service-providing server 40 automatically sets the total coverage region of the base stations, which are stored in the My Base Station DB, as a safety zone at step 308.

Meanwhile, when any of the ward's past location registration information does not exist within the observation region designated by the subscriber, the second embodiment of the present invention notifies the subscriber's mobile terminal of the lack thereof, thus inducing the setting of a new observation region. Furthermore, the second embodiment of the present invention acquires the approximate center of the observation region designated by the subscriber and then performs the generation of the My Base Station DB and the setting of the safety zone on the basis of the approximate center (corresponding to the observation point of the third embodiment).

The method of obtaining the approximate center of the observation region is achieved by obtaining the distance from a most remote coordinate point to another most remote coordinate point that is farthest away from the most remote coordinate point in the observation region and then determining a central location therebetween.

With reference FIG. 4, a method of setting a safety zone according to a third embodiment of the present invention is described. FIG. 4 is a flowchart illustrating a method of setting the safety zone according to a third embodiment of the present invention, which is related to the case where the subscriber designates only an observation point and, thereby the service-providing server 40 designates the observation region.

Using the same method as the step 301 to 304 of the second embodiment, the service-providing server 40 performs the step 401 of registering for service, the step 402 of checking the unique information of the ward's mobile terminal, the step 403 of collecting the past location registration information of the ward's mobile terminal, and the step 404 of storing the collected past location registration information in the separate memory area.

The service provide server 40 temporarily stores the past location registration information, and provides GIS information to the subscriber's mobile terminal. At step 405, the subscriber designates the corresponding point of a map as an observation point using functions, such as region searching/scaling up/scaling down/moving with respect to the GIS information displayed on the mobile terminal. Accordingly, the subscriber's mobile terminal transmits the coordinate information of the observation point, which is designated by the subscriber, to the service-providing server 40.

When receiving the observation point coordinate information, the service-providing server 40 sets a circle having a radius of R1, centered on the coordinates of the observation point, that is, an observation region, at step 406. R1 is determined by a service provider according to test results. R1 is set to be a maximal radius such that, when a circle having a radius of R1 from the center of the observation region is drawn, a number of base stations, which belong to a region of the circle and at which past locations of the ward's mobile terminal have previously been registered, becomes larger than a number of base stations, which belong to the region of the circle and at which the past locations of the ward's mobile terminal have not been registered. In accordance with a test, it is preferred that the diameter of R1 be set to about 2 Km. In this case, R1 is not limited to a fixed value, and may be set so as to be more than two times of the distance L and less than four times of the distance L between two base stations adjacent to the observation point.

When the observation region, as described above, has been set, the service-providing server 40 reads the ward's temporarily stored past location registration information and extracts past location registration information, which is located within the observation region, from among pieces of past location registration information at step 407. Thereafter, the service-providing server 40 allocates the separate memory area to the ward (or subscriber), and allows the extracted past location registration information, that is, the ID information of base stations, to be stored in the memory area allocated to the ward (or subscriber). In this case, the memory area for the ward (or subscriber) becomes the My Base Station DB for the ward (or subscriber) at step 408. When the My Base Station DB is generated, the total coverage region of base stations stored in the My Base Station DB is automatically set as a safety zone at step 409.

Meanwhile, when any past location registration information of the ward does not exist within the observation region in the third embodiment of the present invention, the steps 407 to 409 are repeated using the value of the radius R1 that is equal to or greater than a set value. The process is repeated until all of the past location registration information of the ward exists within the observation region.

Figure 5:
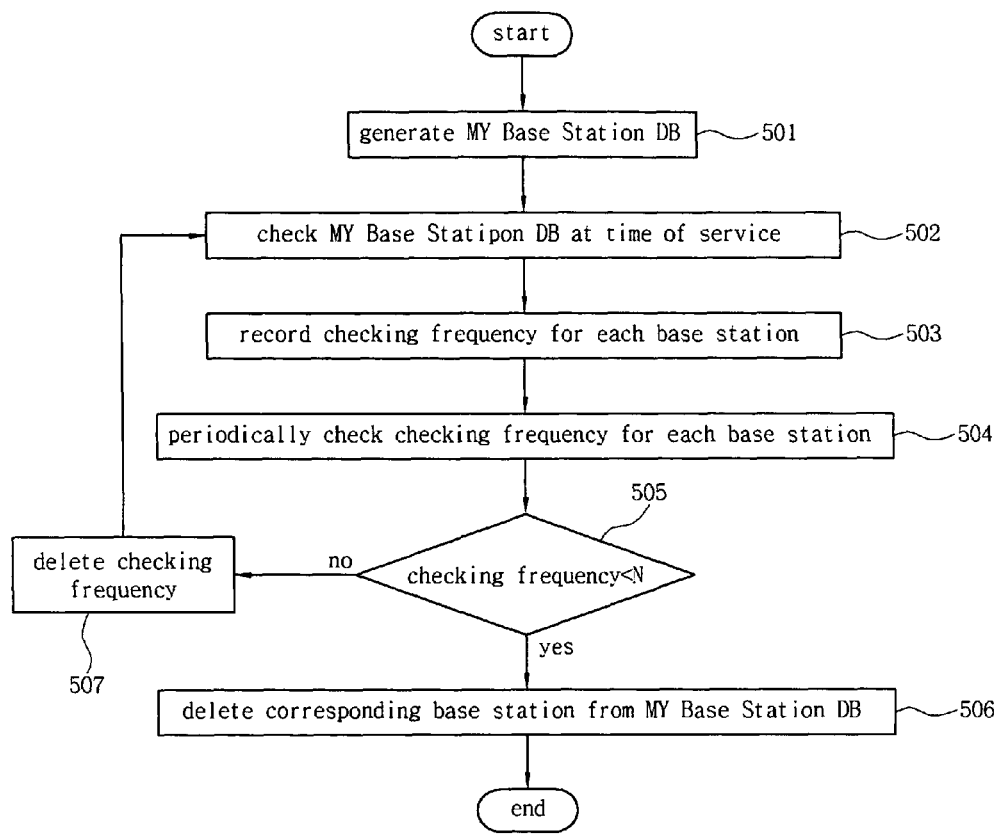
FIG. 5 is a flowchart illustrating a process of deleting information stored in a My Base Station Database (DB) according to the present invention.
Figure 6:
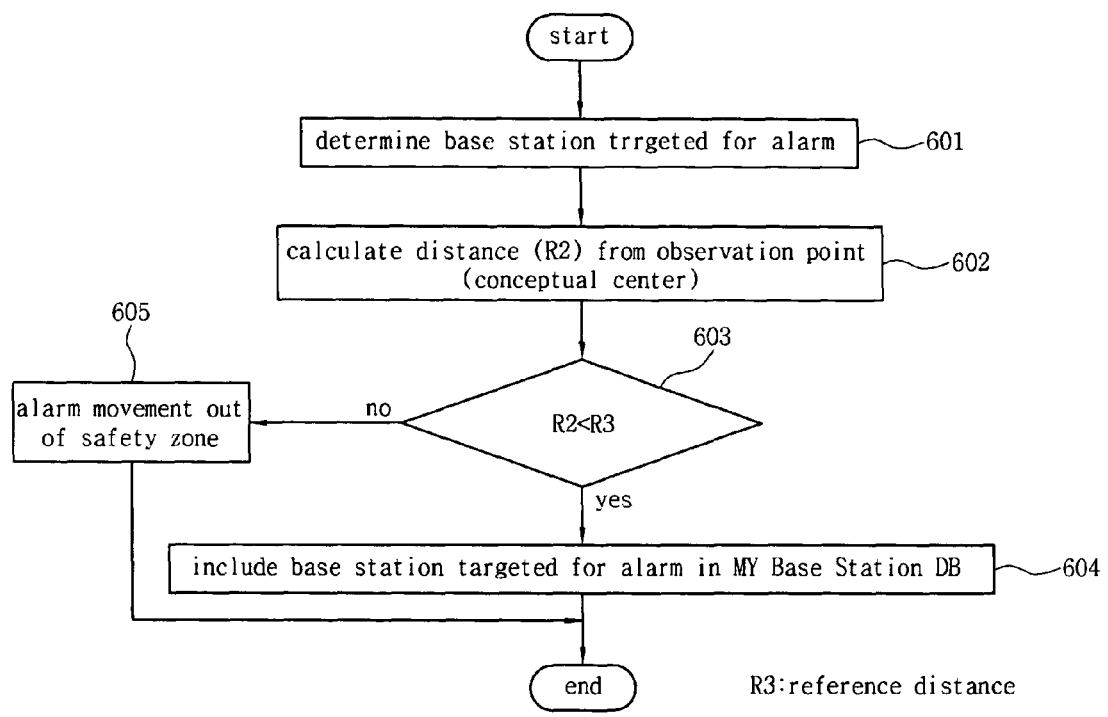
FIG. 6 is a flowchart illustrating a process of adding new information to the My Base Station DB according to the present invention.

With reference to FIGS. 5 and 6, a method of updating the My Base Station DB according to the present invention is described. FIG. 5 is a flowchart illustrating a process of deleting information stored in the My Base Station DB according to the present invention.

As described above, the service-providing server 40 generates a My Base Station DB at step 501. When the service subscriber 40 requests the service of the present invention such that the My Base Station DB is generated, the service-providing server 40 checks the current location of the ward's mobile terminal. Therefore, whenever the ward's mobile terminal moves into a new cell region, the base station identifier information at a current location is transmitted to the service-providing server 40, and the service-providing server 40 checks whether the transmitted base station identifier information has been stored in the My Base Station DB at step 502.

The service-providing server 40 executes an alarm when any base station identifier associated with the location of the ward's mobile terminal information has not been stored in the My Base Station DB. Conversely, the service-providing server 40 continuously monitors the current location of the ward's mobile terminal when the base station identifier associated with the location of the ward's mobile terminal information has been stored in the My Base Station DB. At the same time, the service-providing server 40 increases the number of currently checked base stations that belong to the base stations stored in the My Base Station DB, at step 503.

As described above, whenever the ward's mobile terminal moves to a new base station and a new base station identifier is transmitted to the service-providing server 40, the service-providing server 40 counts the checking frequency for base stations stored in the My Base Station DB. By doing so, the service-providing server 40 can distinguish base stations in a region in which the ward is frequently located from other base stations. That is, a region including a base station having a large checking frequency is an activity region which the ward visits frequently, a region including base stations having low checking frequency is an semi-active region which the ward visits occasionally, and a region including base stations having zero checking frequency is an non-activity region which the ward does not visit at all.

The service-providing server 40 periodically monitors the checking frequency for each base station at step 504, and determines whether a base station having checking frequency lower than an arbitrary natural number N exists, at step 505. If a base station having checking frequency lower than N is found to exist as the result of the determination, the service-providing server 40 deletes the corresponding base station from the My Base Station DB at step 506. Meanwhile, with respect to the base station having checking frequency higher than N, the service-providing server 40 deletes the whole checking frequency and set the checking frequency to an initial value, at step 507.

FIG. 6 is a flowchart illustrating a process of adding new information to the My Base Station DB according to the present invention.

The service-providing server 40 compares the current location of the ward's mobile terminal with the base station information in the My Base Station DB, and monitors whether the ward moves out of the safety zone. If base station identifier information corresponding to the current location of the ward's mobile terminal has not been stored in the My Base Station DB, the service-providing server 40 judges that the ward's mobile terminal has moved out of the safety zone, and determines a base station at a current location to be an alarm target base station, at step 601.

When determining that the base station of current location will be the alarm target base station, the service-providing server 40 acquires the location of the alarm target base station, and calculates a distance R2 between the alarm target base station and the observation point (or approximate center) using the location of the acquired alarm target base station and the observation point (or approximate center) designated by the subscriber, at step 602.

When the distance R2 is calculated, the service-providing server 40 compares the distance R2 and a previously set reference distance R3, and determines whether R2 is shorter than the reference distance, at step 603.

In this case, whether the distance R2 is shorter than the reference distance R3 is determined in order to handle the case where a new base station is installed close to the observation point (or approximate center), or the case where a base station close to the observation point does not usually communicate, and allow the base stations to be included in My Base Station DB in these cases.

In accordance with such an intention, the reference distance R3 is arbitrarily set. In this case, it is preferred that the reference R3 be close to the observation point or the approximate center. In more detail, it is preferred that the reference distance R3 be greater than a distance R1 between two base stations adjacent to the observation position or the approximate center, and be smaller than 2*R1.

As the result of determination at step 603, the service-providing server 40 allows the alarm target base station to be the My Base Station DB if the distance R2 is smaller than the reference distance R3, at step 604. In contrast, the service-providing server 40 executes an alarm if the distance R2 is greater than the reference distance R3, at step 605.

Figure 7:
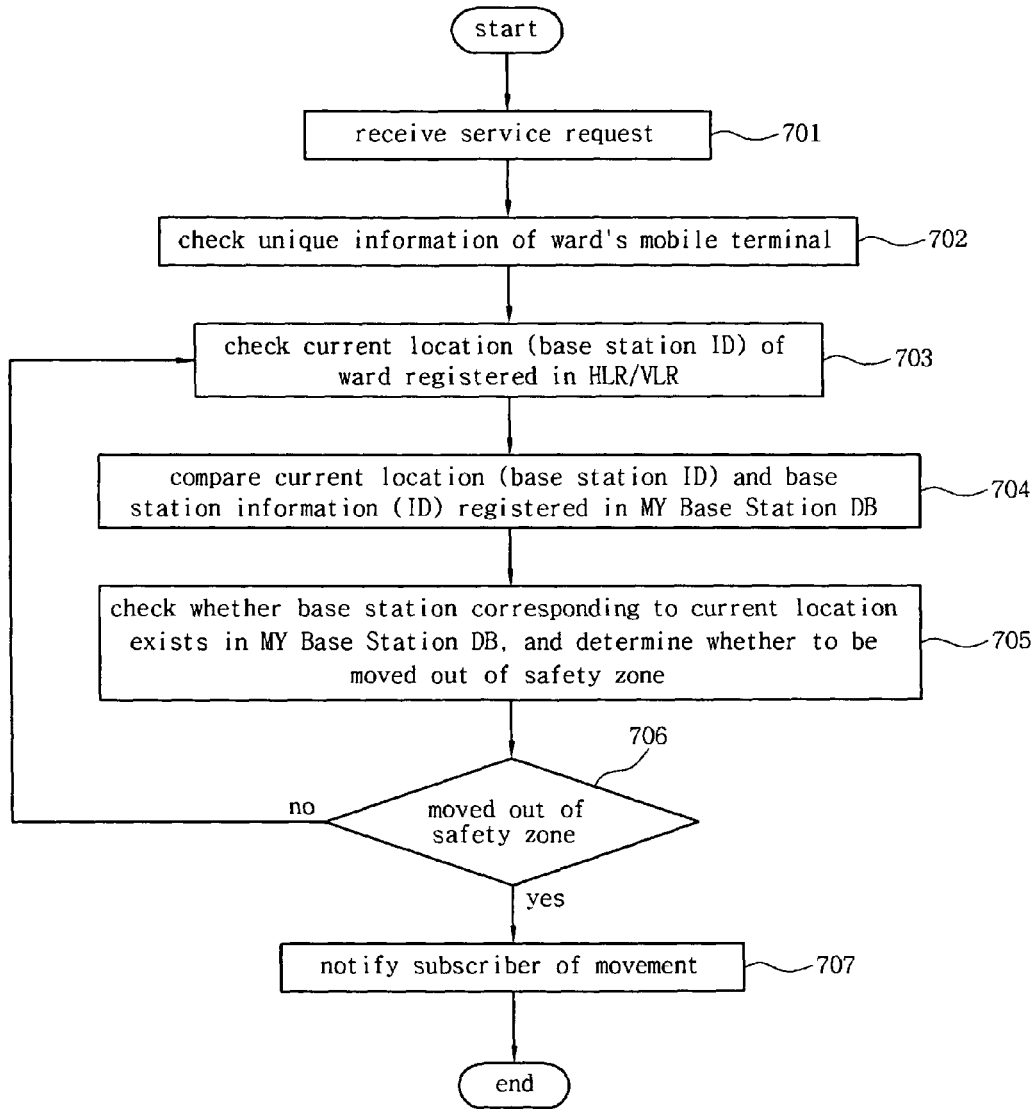
FIG. 7 is a flowchart illustrating a process of monitoring movement out of a safety zone and executing an alarm according to the present invention.

A process of monitoring movement out of a safety zone and executing an alarm by tracking a ward's location at the subscriber's request is described below. FIG. 7 is a flowchart illustrating a process of monitoring movement out of the safety zone and executing an alarm according to the present invention.

For the present service, a My Base Station DB has been generated based on the past location registration information of the ward's mobile terminal, and a safety zone has been set. Thereafter, when the subscriber requests the service, the service-providing server 40 determines whether a service requester is a subscriber through the HLR. The service-providing server starts service if the service requester is a subscriber, at step 701. In this case, the subscriber transmits the MIN of the ward's terminal to the service-providing server

40. If the subscriber is in a state where the MIN information of the ward's terminal is registered in the server, and a ward to be monitored is the same as the ward whose NIM has been registered in the server, it is not necessary to input the MIN of the ward's terminal.

The service-providing server 40 transmits a signal for requesting the current location of the ward to the HLR/VLR 30 using the MIN information of the ward's mobile terminal, at step 702. When receiving the signal for requesting the current location of the ward from the service-providing server 40, the HLR/VLR 30 provides the current location information of the mobile terminal, that is, a base station ID, to the service-providing server 40. By doing so, the service-providing server 40 checks the current location of the ward, that is, a base station ID, at step 703.

When the current location of the ward, that is, the base station ID, has been checked, the service-providing server 40 compares the checked base station ID and the base station ID stored in the My Base Station DB at step 704. As the result of the comparison, the service-providing server 40 judges that the ward has moved out of the safety zone when the current location of the ward, that is, the base station ID, has not been stored in the My Base Station DB, at step 705. In contrast, the service-providing server 40 judges that the ward remains within the safety zone when the current location of the ward, that is, the base station ID, has not been stored in the My Base Station DB, at step 705.

The service-providing server 40 continuously monitors variation in the current location of the ward if the ward does not move out of the safety zone at step 706. In contrast, the service-providing server 40 executes an alarm for providing information to the guardian's mobile terminal, that is, the subscriber's mobile terminal, about the movement at step 707 if it is determined that the ward has moved out of the safety zone at step 706.

In the present invention, GIS information about the region designated by the subscriber, that is, the safety zone, can be provided to the subscriber's mobile terminal when the subscriber requests service.

Furthermore, the ward's current location information can be displayed on a map. Furthermore, in the present invention, the path of motion of the ward can be displayed on the guardian's mobile terminal. For this purpose, the service-providing server 40 uses the location registration history information of the ward's mobile terminal.

The present invention sets a safety zone based on the location registration history information of a ward's mobile terminal, and can inform the guardian of the ward's movement when the ward moves out of the safety zone. Furthermore, the present invention causes the range of the safety zone to be successively maximized to keep up with the ward's location registration history, thus being capable of precisely disclosing the ward's movement.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing alarm service regarding movement of a mobile terminal, the method comprising:
   acquiring past location registration information for the mobile terminal designated by a subscriber, the past location registration information being base station identifiers associated with base stations to which the mobile terminal have previously been registered;
   generating a base station database by selectively including the base stations to which the mobile terminal have previously been registered according to an observation region designated by the subscriber;
   acquiring current location information, the current location information being a base station identifier associated with a current base station to which the mobile terminal is currently registered;
   determining whether the current location information is stored in the base station database;
   incrementing, by a service-providing server, a checking frequency for the current base station according to the current location information when the current location information has been stored in the base station database and storing the checking frequency in the base station database;
   monitoring the checking frequency;
   removing a base station from the base station database when its corresponding checking frequency calculated during a latest period is smaller than a predetermined value; and
   notifying the subscriber if the current location information is not stored in the base station database.

2. The method according to claim 1, further comprising:
   defining the observation region;
   calculating a distance between a center of the observation region and the current base station to which the mobile terminal is currently registered;
   including the current base station in the base station database if the calculated distance is smaller than a reference distance; and
   generating an alarm if the calculated distance is greater than a reference distance.

3. The method according to claim 2, wherein the reference distance is greater than a distance between two base stations adjacent to the center of the observation region designated by the subscriber, and is shorter than two times of the distance between the two base stations adjacent to the center of the observation region.

4. The method according to claim 2 further comprising:
   when no base station exists within the observation region, obtaining the center of the observation region, defining a reference circle region having a radius of R1 around the center, and checking base stations existing within the reference circle region, wherein R1 is set to be larger than a radius of the observation region designated by the subscriber.

5. The method according to claim 4, wherein R1 is set to be a maximal radius such that, within the reference circle region, a number of base stations at which past locations of the mobile terminal have previously been registered is larger than a number of base stations at which the past locations of the mobile terminal have not previously been registered.

6. The method according to claim 4, wherein R1 is set so as to be greater than two times of a distance between two base stations adjacent to the center of the observation region and shorter than four times of the distance between the two base stations adjacent to the center of the observation region.

7. The method according to claim 2 further comprising:
   designating a specific point; and
   defining the observation region to be a reference circle region having a radius of R2 around the specific point;
   wherein R2 is a maximal radius such that, within the reference circle region, a number of base stations at which the mobile terminal have previously been registered is larger than a number of base stations at which the mobile terminal have not been registered.

8. The method according to claim 2 further comprising:
designating a specific point; and
defining the observation region to be a reference circle region having a radius of R2 around the specific point;
wherein R2 is greater than two times of a distance between two base stations adjacent to the specific point and shorter than four times of the distance between the two base stations adjacent to the specific point.

9. The method according to claim 2 the current location information is acquired according to a Mobile Identification Number of the mobile terminal.

10. The method according to claim 9, wherein the Mobile Identification Number of the mobile terminal is acquired from information stored in the base station database.

* * * * *